No. 854,179. PATENTED MAY 21, 1907.
H. W. SANDERSON.
PAPER MEASURING AND CUTTING MACHINE.
APPLICATION FILED MAR. 20, 1906.

4 SHEETS—SHEET 1.

Witnesses
C. P. Wright, Jr.
E. R. Peck

Inventor
H. W. Sanderson,
By A. S. Pattison,
Atty

No. 854,179. PATENTED MAY 21, 1907.
H. W. SANDERSON.
PAPER MEASURING AND CUTTING MACHINE.
APPLICATION FILED MAR. 20, 1906.
4 SHEETS—SHEET 2.
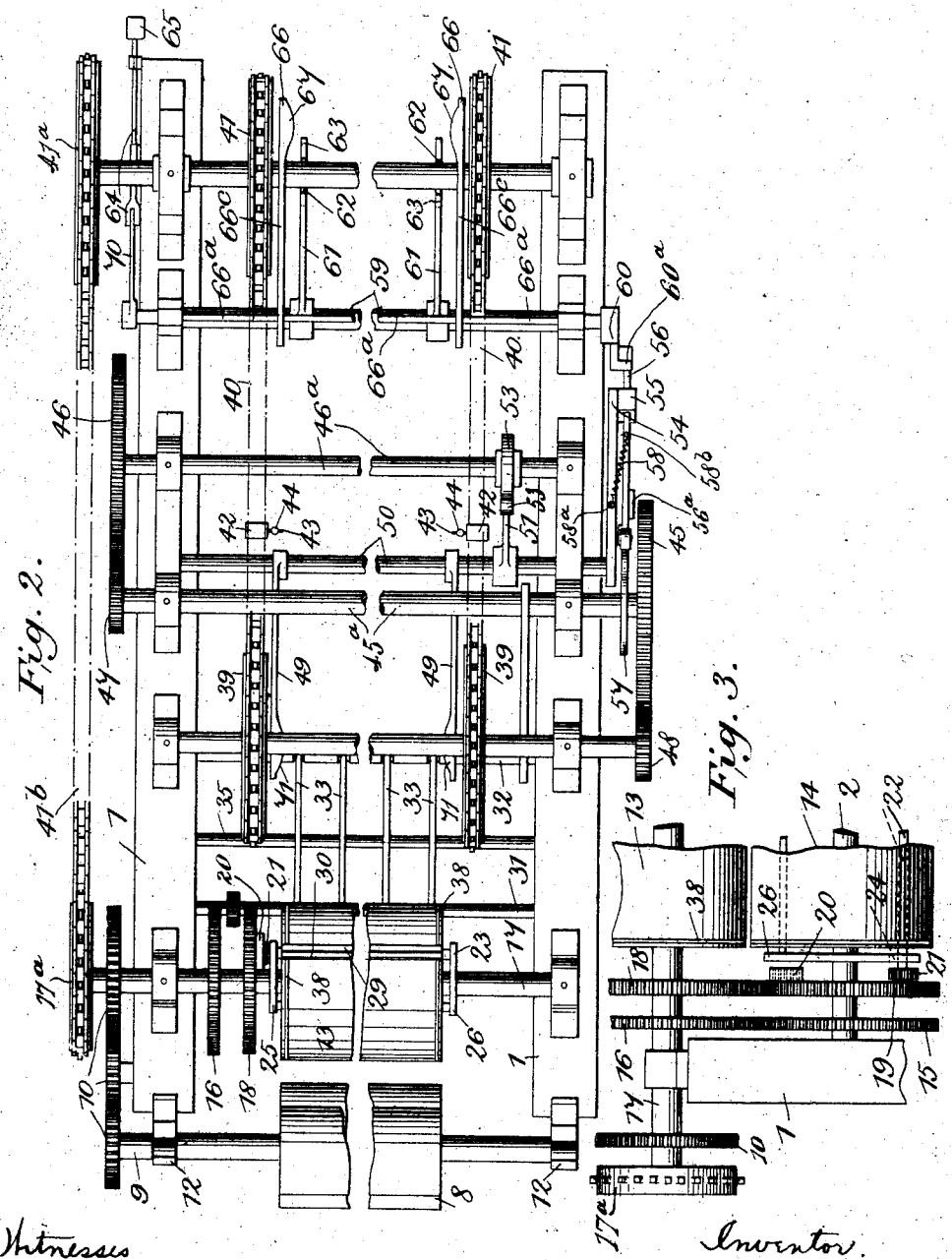
Witnesses
C. R. Wright Jr.
E. R. Peck
Inventor.
H. W. Sanderson,
By A. Pattison,
Atty No. 854,179. PATENTED MAY 21, 1907.
H. W. SANDERSON.
PAPER MEASURING AND CUTTING MACHINE.
APPLICATION FILED MAR. 20, 1906.

4 SHEETS—SHEET 3.

No. 854,179. PATENTED MAY 21, 1907.
H. W. SANDERSON.
PAPER MEASURING AND CUTTING MACHINE.
APPLICATION FILED MAR. 20, 1906.
4 SHEETS—SHEET 4.
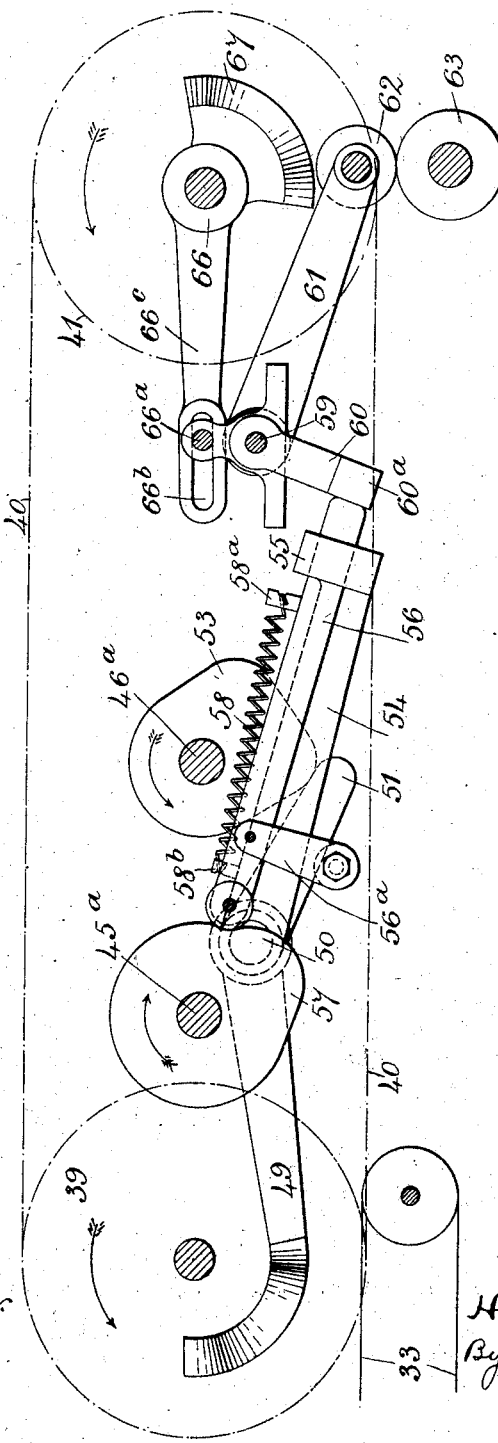

UNITED STATES PATENT OFFICE.

HAROLD W. SANDERSON, OF LONDON, ENGLAND, ASSIGNOR TO THE WALL PAPER MANUFACTURERS LIMITED, OF LONDON, ENGLAND.

PAPER MEASURING AND CUTTING MACHINE.

No. 854,179. Specification of Letters Patent. Patented May 21, 1907.

Application filed March 20, 1906. Serial No. 307,039.

*To all whom it may concern:*

Be it known that I, HAROLD WILLIAM SANDERSON, a subject of the King of Great Britain and Ireland, and resident of London, W. C., England, have invented new and useful Improvements in Paper Measuring and Cutting Machines, of which the following is a specification.

This invention relates to a measuring and cutting machine for cutting uniform lengths from continuous strips of paper or other material hereinafter referred to as paper which is so constructed that the paper is automatically measured and cut at uniform lengths and that after one length has been cut the end of the new piece is conveyed to the front end of the machine.

Figure 1:
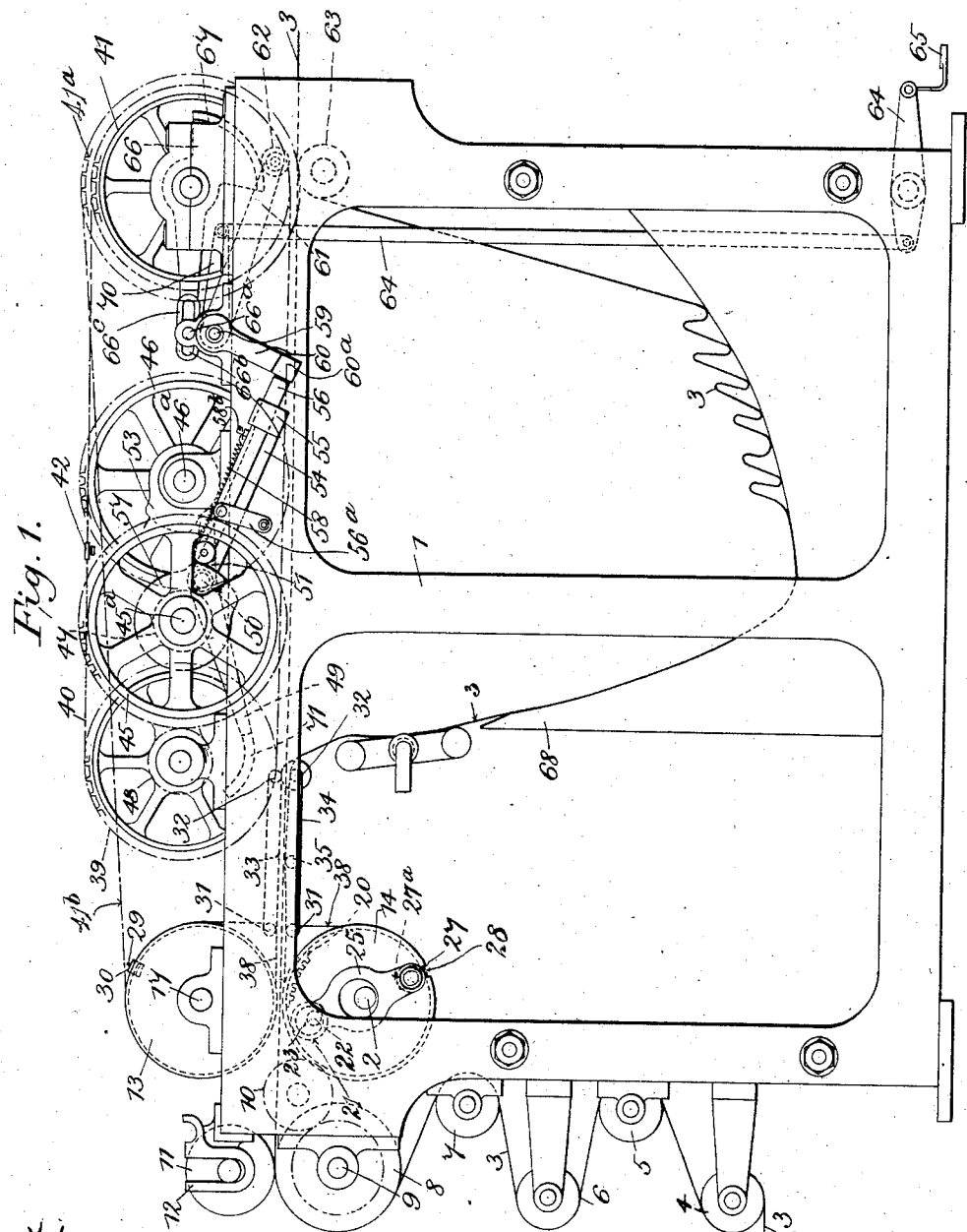
Figure 4:
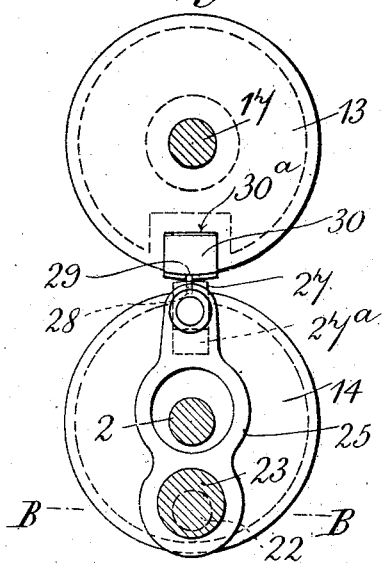
Figure 6:
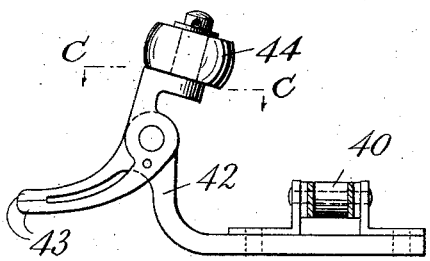
Figure 7:
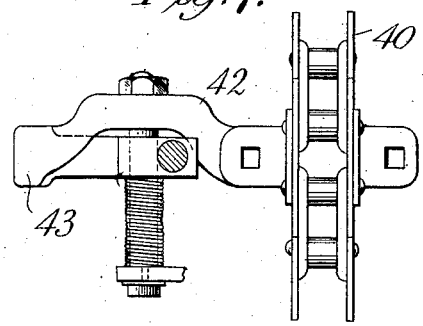
Figure 5:
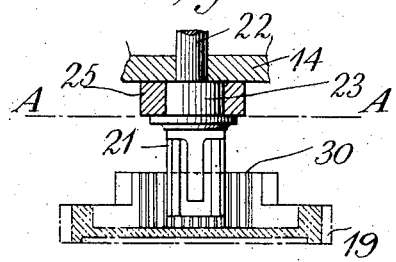

In the accompanying drawings, Figure 1 is a side view of the machine Fig. 2 is a plan of the same. Fig. 3 is a part end elevation with parts removed. Fig. 4 is a vertical section on the line A A of Fig. 5 and Fig. 5 is a horizontal section on the line B B of Fig. 4 showing the cutting mechanism. Fig. 6 is an end elevation of one of the paper grippers. Fig. 7 is a horizontal section thereof on the line C C of Fig. 6. Fig. 8 is a part side elevation to a larger scale than that of Fig. 1.

The main shaft 2 from which the several parts of the machine receive their motion is mounted to rotate in brackets fixed to the machine frame 1 near its rear end.

The paper sheet 3 is conveyed to the machine at a uniform speed by means of a paying-out apparatus of any suitable construction and is guided over tensioning rollers 4, 5, 6, 7 to a measuring roller 8. The axle 9 of the measuring roller 8 is driven from the main shaft 2 by means of toothed wheel gearing 10. By altering the speed of the measuring roller 8, as by changing the toothed wheels 10 for others of different ratio, the length of the piece to be cut can be varied.

A counter pressure roller 11, mounted in open bearings 12, is provided above the measuring roller 8 to press the paper sheet uniformly on to this roller.

The paper sheet 3 passes from the measuring roller 8 between cutting rollers 13 and 14 which are arranged not to touch each other so that the paper sheet 3 can pass freely between them. The two cutting rollers run at equal speed.

The axle 17 of the top cutting roller 13 is rotated from the main shaft 2, which also serves as an axle for the bottom cutting roller 14, by means of toothed wheel gearing 15, 16, see Figs. 2 and 3. To the axle 17 of the top cutting roller is keyed a second toothed wheel 18 gearing into a racing wheel 19 which is loosely mounted on the axle 2. This racing wheel 19 has one tooth less than the toothed wheel 18. To the inner face of the racing wheel 19 is fixed an internally toothed segment 20 adapted to engage with a small spur wheel 21, see Figs. 1 and 3 at the end of a shaft 22 which is passed through a suitable boring in the ends of the bottom cutting roller 14. Eccentrics 23, 24 are provided, one at each end of said shaft 22, which revolve in cast iron brackets 25, 26 respectively. To the ends of these cast iron brackets is fixed the ends of a steel bar 27 arranged to move in a suitable groove 27$^a$ formed in the bottom cutting roller 14. The steel bar 27 has a groove 28 in its upper surface adapted to receive a knife 29 provided in a bar 30 located in a groove 30$^a$ of the upper cutting roller 13 see Figs. 4 and 5.

In front of the cutting rollers 13, 14 there are arranged two sets of grooved tape rollers 31, 31, and 32, 32 in the grooves of which run tapes 33, 34 respectively and which are pressed together about midway between the rollers by a roller 35 so as to form a narrow passage for the paper sheet 3. The tape rollers 31, 31 and the cutting rollers 13, 14 are provided with grooves for the reception of spring strings 38 Figs. 1, 2 and 3 which prevent the paper sheet 3 from slipping out of its proper path when cut off.

In front of the cutting rollers 13, 14 two chain wheels 39 are situated (one at each side of the frame) which are connected by means of chains 40 with chain wheels 41 mounted to rotate in suitable bearings near the front end of the frame 1. To each of the chains 40 a gripper 42, is clasped in such a manner that they inwardly project, see Figs. 6 and 7, so that their fingers 43 move over the surface of the paper sheet 3. The shaft of the chain wheels 41 is driven by chain wheels 41$^a$ and 17$^a$ and a chain 41$^b$ from the shaft 17 of the upper cutting roller which as before described is driven from the main shaft 2. The grippers 42 are each furnished with a rotary collar 44 that is connected with the lower hinged part of the spring influenced fingers 43 Figs. 6 and 7.

Between the chain wheels 39 and 41 two large toothed wheels 45 and 46 are rotatably mounted in brackets fixed to the frame of the machine one at each side. The toothed wheel 45 is engaged by a wheel 48 on the shaft of the chain wheels 39 and the toothed wheel 46 is engaged by a toothed wheel 47 on the shaft 45$^a$ of the toothed wheel 45.

Two shape levers 49 Figs. 1, 2 and 3, are rigidly fixed to an axle 50 which is mounted to rock in bearings fixed to the frame 1 and so arranged that their ends project into the path of the rotary collars 44 of the grippers when the axle 50 is partially rotated and the levers 49 are lifted. To the axle 50 is fixed a downwardly inclined forwardly projecting short arm 51 which is acted upon by a cam 53 keyed to the axle 46$^a$ of the large toothed wheel 46. To the axle 50 of the shape levers 49 there is also keyed an arm 54 which has a sleeve 55 at its front end in which is guided a pushing rod 56 adapted to be moved to and fro by a cam 57 keyed to the axle 45$^a$ of the large toothed wheel 45.

The pushing rod 56 is under the influence of a spiral spring 58 one end of which is fixed to a pin 58$^a$ projecting from the rod 56 and the other end of which is fixed to a pin 58$^b$ projecting from the arm 54, and which pulls the rod 56 toward cam 57.

56$^a$ is a swinging link pivoted to a fixed pin on the frame and to the bar 56 so as to guide such bar in its movements.

To an axle 59 revolubly mounted in suitable bearings between the axle of the large toothed wheel 46 and the front chain wheels 41 an arm 60 is fixed the projecting end 60$^a$ of which abuts against the end of the pushing rod 56 when the latter is in its operative position. To the axle 59 there are further keyed two bracket arms 61 in the front ends of which a dropper roller 62 is mounted. Below the dropper roller 62 rings 63 are arranged, which together with the former serve as clamping device for the front end of the cut-off paper sheet. To the axle 59 there is also connected the arm 70 of treadle lever mechanism 64 which is connected at the bottom end with a treadle 65 arranged near the bottom of the right front upright of the frame 1.

Loosely mounted on the axle of the front chain wheel 41 are two levers 66 which are fitted with inclines or cam faces 67 for operating the grippers 42 and are prevented from rotating by a rod 66$^a$ which is fixed to the bearings of the shaft 59 and extends through slots 66$^b$ formed in rearwardly extending arms 66$^c$ of the levers 66.

The machine operates as follows:—The paper sheet 3, which is rolled off the reel by means of paying out apparatus not shown or described as it does not form part of this invention, is guided over the tensioning rollers 4, 5, 6 7 to the measuring roller 8 and form there between the cutting rollers 13, 14, the spring stays 38, and the tapes 33, 34 into the chute 68 and from thence over the rings 63 at the front end of the machine. At a certain part of the revolution of the racing wheel 19 the toothed segment 20 connected with the same engages with the spur wheel 21 and thus roates the shaft 22 in the bottom cutting roller 14 which shaft then, by means of its eccentrics 23, 24, lifts the grooved bar 27 of the bottom cutting roller 14 so that in the course of the further revolutions of said cutting rollers the lifted grooved bar comes into contact with the knife 29 of the top cutting roller 13 which enters the groove 28 of the bar and thus cuts off the paper, whereupon the front end of the fresh piece of the paper sheet passes onward between the tapes 33, 34. At the same time the shape levers 49 have been lifted by the cam 53 pressing on the arm 51 thus turning the shaft 50, so that when the traveling grippers 42 reach the shape levers 49 their rotary collars 44 travel up the inclines 71 of the shape levers, and the fingers 43 which are thereby opened, pass under the paper sheet 3 and being closed under the influence of their springs as soon at the collars 44 go down the inclines, grip the front end of the fresh piece as soon as it leaves the tapes. The grippers 42 then convey the new piece of paper along toward the front end of the machine and pass the same between the rings 63 and the dropper rollers 62 which are lifted at the proper moment to allow the paper to pass. The lifting of the dropper roller 62 takes place in consequence of the pushing rod 56 pushing under the action of the cam 57 against the arm 60 and thereby rotating the axle 59 and lifting the bracket arms 61. When the levers 49 are down the end of the pushing rod 56 is clear of the projecting end 60$^a$ of the arm 60 so that the pushing rod 56 can only push against the end of arm 60 when the shape levers 49 are in their raised position, in consequence of the partial revolution of axle 50 in which the arm 54 participates pulling the pushing rod 56 down by means of the sleeve 55. As soon as the axle 59 returns to its original position the dropper rollers 62 drop on to the rings 63 thus holding the front end of the fresh piece. Simultaneously the rotary collars 44 of the grippers 42 travel up the inclines 67 of the shape levers 66 whereby the fingers 43 are opened and the paper is released. The paper sheet is at this moment between the clamping device 62, 63 and the tapes 33, 34 respectively and falls gradually and smoothly down into the chute 68 when more paper is arriving through the tapes. To release the front end of the cut piece of paper from the clamping device 62, 63, the lever arrangement 64, 70 is operated from the treadle 65 whereby the axle 59 is partially rotated and, consequently the bracket arms 61 with the dropper rollers 62 are lifted.

The cut pieces of paper may be wound up by means of any suitable device.

What I claim is:—

1. In apparatus for measuring and cutting uniform lengths from continuous strips of paper or other material, means adapted to cut off a length of material from the strip, means for feeding a measured portion of the strip to said cutting means, means adapted to grip the end of the strip and convey it to the delivery end of the apparatus, and means for actuating said cutting means at regular intervals.

2. In apparatus for measuring and cutting uniform lengths from continuous strips of paper or other material, means adapted to cut off a length of material from the strip, means for feeding a measured portion of the strip to said cutting means, means at the delivery end of the apparatus adapted to hold the end of the strip, means adapted to grip the end of the strip and convey it to said holding means, and means for actuating said cutting means at regular intervals.

3. In apparatus for measuring and cutting uniform lengths from continuous strips of paper or other material, means adapted to cut off a length of material from the strip, means for feeding a measured portion of the strip to said cutting means, means at the delivery end of the apparatus adapted to hold the end of the strip, means adapted to grip the end of the strip and convey it to said holding means, means adapted to release the strip from said holding means at will, and means for actuating said cutting means at regular intervals.

4. In apparatus for measuring and cutting uniform lengths from continuous strips of paper or other material, means adapted to cut off a length of material from the strip, means for feeding a measured portion of the strip to said cutting means, means at the delivery side of said cutting means adapted to draw the strip forwardly, means adapted to grip the end of the strip as it leaves said drawing means and convey it to the delivery end of the apparatus, and means for actuating said cutting means at regular intervals, substantially as set forth.

5. In apparatus for measuring and cutting uniform lengths from continuous strips of paper or other material, a pair of rotary cutting rollers arranged one above the other but not in contact, means for feeding a measured portion of the strip between said pair of cutting rollers, a knife blade on one roller of said pair of rollers, a counterpart for said knife blade on the other roller of said pair of rollers, and means for periodically moving said counterpart toward said knife blade to cut off a length of the strip, substantially as set forth.

6. In apparatus for measuring and cutting uniform lengths from continuous strips of paper or other material, a pair of cutting rollers each formed with a longitudinal groove in its periphery said rollers being arranged one above the other but not in contact, means for feeding a measured portion of the strip between said pair of cutting rollers, a knife blade removably secured in the groove of the upper of said pair of cutting rollers, a bar formed with a groove to receive said knife blade mounted to slide in the groove of the bottom of said pair of rollers and means for periodically moving said grooved bar toward said knife, substantially as set forth.

7. In apparatus for measuring and cutting uniform lengths from continuous strips of paper or other material, a pair of cutting rollers each formed with a longitudinal groove in its periphery said rollers being arranged one above the other but not in contact, means for feeding a measured portion of the strip between said pair of cutting rollers, means for rotating said rollers simultaneously and at a uniform peripheral speed, a knife blade removably secured in the groove of the upper of said pair of cutting rollers, a bar formed with a groove to receive said knife blade mounted to slide in the groove of the bottom of said pair of rollers and means for periodically moving said grooved bar toward said knife, once in each revolution of said rollers, substantially as set forth.

8. In apparatus for measuring and cutting uniform lengths from continuous strips of paper or other material, a pair of cutting rollers each formed with a longitudinal groove in its periphery said rollers being arranged one above the other but not in contact, means for feeding a measured portion of the strip between said pair of cutting rollers, means for rotating said rollers simultaneously and at a uniform peripheral speed, a knife blade removably secured in the groove of the upper of said pair of cutting rollers, a bar formed with a groove to receive said knife blade mounted to slide in the groove of the bottom of said pair of rollers, axles on which said rollers are fixed, a toothed wheel fixed on the upper of said axles, a toothed wheel gearing into said toothed wheel of said upper axle and mounted to freely rotate on the lower of said axles, an internally toothed segment fixed to said toothed wheel of said lower axle, shaft bearings in the ends of said lower roller, a shaft extending through said lower roller mounted to rotate in said bearings, a pinion on said shaft adapted to be engaged by and arranged in the path of said toothed segment, eccentrics on said shaft, and arms connected to said grooved bar and mounted on said eccentrics, substantially as set forth.

9. In apparatus for measuring and cutting uniform lengths from continuous strips of paper or other material, means adapted to cut off a length of material from the strip, means for feeding a measured portion of the strip to said cutting means, means at the delivery end of the apparatus adapted to hold the end of the strip, a pair of chain wheels near the delivery end of the machine, a pair of chain wheels near the cutting means, endless chains engaging said chain wheels and connecting the corresponding wheels of each said pair, means for rotating one of said pair of chain wheels, spring fingers adapted to grip the end of the strip fixed in pairs to said chains, devices near said cutting means in the path of said fingers adapted to open said fingers against their spring action to admit passage of the strip end therethrough, devices near the said holding means at the delivery end of the apparatus in the path of said fingers adapted to open said fingers against their spring action to release said strip, and means for actuating said cutting means at regular intervals, substantially as set forth.

10. In apparatus for measuring and cutting uniform lengths from continuous strips of paper or other material, means adapted to cut off a length of material from the strip, means for feeding a measured portion of the strip to said cutting means, means at the delivery end of the apparatus adapted to hold the end of the strip, a pair of chain wheels near the delivery end of the machine, a pair of chain wheels near the cutting means, endless chains engaging said chain wheels and connecting the corresponding wheels of each said pair, means for rotating one of said pair of chain wheels, spring fingers adapted to grip the end of the strip fixed in pairs to said chains, releasing rollers on said fingers, movable releasing cams near said cutting means, means for periodically moving said releasing cams into the path of said releasing rollers, stationary releasing cams near said holding means at the delivery end of the apparatus in the path of said releasing rollers, and means for actuating said cutting means at regular intervals, substantially as set forth.

11. In apparatus for measuring and cutting uniform lengths from continuous strips of paper or other material, means adapted to cut off a length of material from the strip, means for feeding a measured portion of the strip to said cutting means, an axle mounted in fixed bearings at the delivery end of the apparatus, rings mounted on said axle, a dropper roller located above said rings, levers in which said dropper roller is carried, an axle to which said levers are fixed, an operating arm on said axle, a pair of chain wheels near the delivery end of the machine, a pair of chain wheels near the cutting means, endless chains engaging said chain wheels and connecting the corresponding wheels of each said pair, axles on which said pairs of wheels are fixed, means for rotating one of said axles, spring fingers adapted to grip the end of the strip fixed in pairs to said chains, releasing rollers on said fingers, releasing cams near said cutting means, pivoted levers to which said releasing cams are fixed, a cam adapted to bear on said cam levers and move them to bring said cams into the path of releasing rollers, a rotary axle on which said lever operating cams are fixed, gearing between one of said chain wheel axles and said cam axle for rotating said cam axle, a sliding pusher bar connected to one of said cam levers and arranged in the path of said operating arm when said cam levers are in their operative positions, a roller on said pusher bar, a cam adapted to bear against roller and move said pusher bar in a direction to operate said operating arm, a spring to keep said pusher bar against said cam, a rotary axle on which said pusher bar cam is fixed, gearing for rotating said pusher bar cam axle from one of said ratchet wheel axles, stationary releasing cams near said dropper roller in the path of said releasing rollers, means for lifting said dropper rollers at will, and means for actuating said cutting means at regular intervals, substantially as set forth.

In testimony whereof I have hereunto set my hand in presence of two subscribing witnesses:

HAROLD W. SANDERSON.

Witnesses:
I. F. K. STIPLING,
H. D. JAMESON.